United States Patent
Eom

(12) 
(10) Patent No.: US 6,661,752 B2
(45) Date of Patent: Dec. 9, 2003

(54) APPARATUS PROTECTING HEADER REGION OF OPTICAL DISC AND METHOD THEREFOR

(75) Inventor: Woo-sik Eom, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 357 days.

(21) Appl. No.: 09/809,425

(22) Filed: Mar. 16, 2001

(65) Prior Publication Data

US 2002/0001268 A1 Jan. 3, 2002

(30) Foreign Application Priority Data

May 30, 2000 (KR) ......................................... 2000-29299
Jun. 20, 2000 (KR) ......................................... 2000-33839

(51) Int. Cl.[7] ................................................ G11B 7/00
(52) U.S. Cl. .................... 369/47.1; 369/47.11; 369/59.1
(58) Field of Search ............................ 369/47.1, 47.11, 369/47.18, 47.21, 47.5, 47.51, 53.1, 53.2, 53.21, 59.1, 59.12, 59.23, 59.25

(56) References Cited

U.S. PATENT DOCUMENTS 6,493,302 B2 * 12/2002 Takahashi ................ 369/53.15
6,545,963 B2 * 4/2003 Deguchi et al. ......... 369/47.28

* cited by examiner

Primary Examiner—Muhammad Edun
(74) Attorney, Agent, or Firm—Staas & Halsey

(57) ABSTRACT

A method protecting a header region formed in an optical disc when a signal is written on the optical disc and an apparatus therefor. The method protecting a header region of an optical disc write apparatus comprises detecting the header region from an RF signal detected from the optical disc through a pick up, generating a write clock, generating a write control signal whose state is inverted after the lapse of a predetermined clock by counting the write clock, generating a write stop signal when the write control signal is generated in the header region detected in the detecting of the header region, and controlling the intensity of the write laser beam corresponding to the write control signal. The generating of the write stop signal comprises feeding the write control signal back to the generating of the write control signal to control the write control signal.

31 Claims, 6 Drawing Sheets

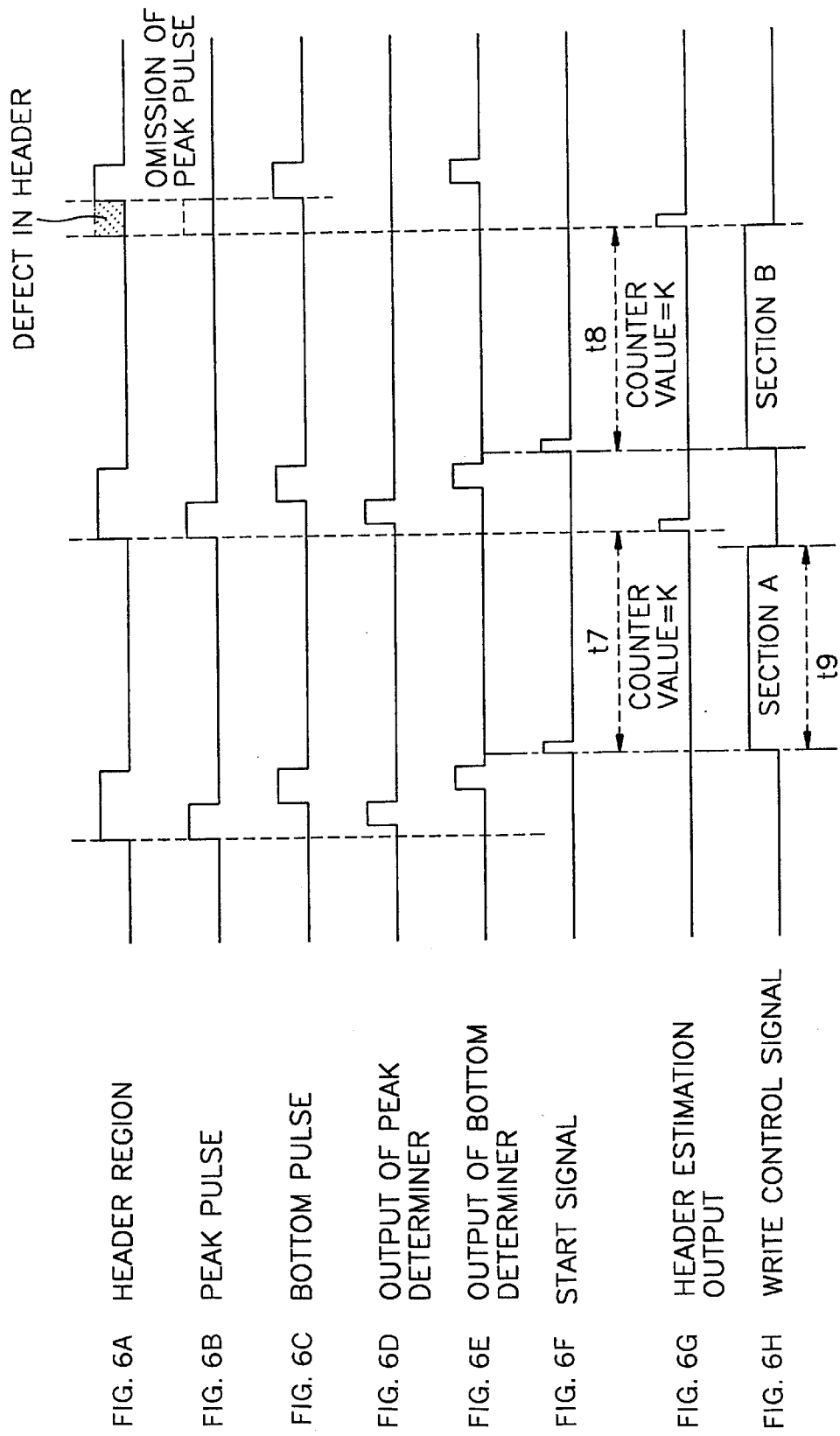

APPARATUS PROTECTING HEADER REGION OF OPTICAL DISC AND METHOD THEREFOR

CROSS REFERENCE TO RELATED APPLICATIONS

This Application claims the benefit of Korean Application No. 00-29299, filed on May 30, 2000 and Korean Application No. 00-33839 filed on Jun. 20, 2000, in the Korean Industrial Property Office, the disclosures of which are incorporated herein by reference.

BACKGROUND OF THE INVENTION

1. Field of the Invention

The present invention relates to an optical disc write apparatus and a method therefor, and more particularly, to an apparatus protecting the header region of an optical disc and a method therefor, by which it is possible to prevent a signal from being overwritten in a header of the optical disc when the signal is written on the optical disc.

2. Description of the Related Art

A DVD-RAM is a system for writing a signal on an optical disc and reproducing a signal from an optical disc. The optical disc used for the system is divided into a plurality of sectors, each of which consists of a header region and a write region. Overwriting is not allowed in the header region of the optical disc during repetitive writing and reproducing processes. The repetitive writing function of the DVD-RAM can be realized using the data region of the optical disc, on which data can be repetitively written and reproduced. However, since the header region and the write region of the optical disc used for the DVD-RAM are formed of a material on which data can be written, a write apparatus must be controlled so that data is not overwritten in the header region when data is repetitively written.

However, when data is written on the DVD-RAM disc, the data can be overwritten in the header region. Accordingly, a corresponding sector cannot often be used. Representative factors are as follows. First, when the length of a write clock period used for making a write control signal (a write gate) for turning on and off the output of a write laser beam is greater than a normal length of the write clock, data can be written in the header region of the next sector after the data is written in the data region and the buffer region of a current sector. Second, data can be overwritten in the header region since a jump from a zone where data is currently written to other zones can occur due to a disturbance or other factors. Third, data can be overwritten in the header region when a write clock is generated using fixed crystal (X-tal) that cannot sense change in the rotation speed of a disc, and the rotation speed of a spindle motor is excessively high.

Further, a data region of the optical disc often cannot be fully used since pulse noise after a header pulse that detects a header region can erroneously be determined to indicate another header region, thus stopping data writing.

SUMMARY OF THE INVENTION

To solve the above problems, it is an object of the present invention to provide an apparatus and a method preventing data from being overwritten in a header region by removing noise having a narrow width in a signal detecting the header region. Further, it is an object of the present invention to prevent data from being overwritten in the header region when there are defects in the header region of the disc.

It is also an object of the present invention to provide an apparatus and a method to prevent data writing from being stopped when a data region is mistaken for a header region. In particular, it is an object of the present invention to prevent data writing in the data region from being stopped due to noise generated after a header pulse.

Additional objects and advantages of the invention will be set forth in part in the description which follows and, in part, will be obvious from the description, or may be learned by practice of the invention.

Accordingly, to achieve the above and other objects, there is provided an apparatus protecting the header region of an optical disc write apparatus, comprising a pick-up reading a signal written on an optical disc, the signal being an RF signal, a write controller (an auto laser power controller (ALPC)) controlling the light intensity of the laser beam emitted from the pick-up by changing the light intensity of the write laser beam emitted from the pick-up corresponding to a write control signal to write a signal on the optical disc, and a write control signal generator controlling the write controller. The write control signal generator further includes a header region detector detecting a header signal included in the RF signal and a header protector generating write control signals to the write controller, such as the ALPC, and guarding against overwriting in the header region of the optical disc.

The header region detector includes a peak detector slicing an upper header signal included in the RF signal by a first voltage level and detecting a peak pulse, a bottom detector slicing a lower header signal included in the RF signal by a second voltage level and detecting a bottom pulse, a first window processor removing pulse noise having a narrow width, which is included in the peak pulse, a second window processor removing pulse noise having a narrow width, which is included in the bottom pulse, and an OR gating portion performing an OR operation on a peak signal that is the output signal of the first window processor and a bottom signal that is the output signal of the second window processor.

The header protector includes a write clock generator generating a write clock used as the reference clock of the write control signal generator, and a write stop signal generator generating a write stop signal compulsorily preventing generation of a write control signal. The write clock generator generating the write clock can be formed by using a crystal (X-tal) whose frequency is uniform and/or using a wobble signal detected from the RF signal.

The header protector further includes a counter counting the write clock and a count start signal detector starting the counting operation of the counter. The counter outputs a first state "H," that is, a writing allowed state from a count start signal until the count value becomes a predetermined value, and a second state "L," that is, a writing forbidden state by resetting the counter when the count value becomes a predetermined value. Also, since the counter is compulsorily reset by the write stop signal, the counter can output the writing forbidden state, that is, the state "L" before the counter value becomes the predetermined value. A count start signal detector demodulates the RF signal detected through the pick-up, detects physical identification data (PID) that is header information, and generates the count start signal from the PID.

The write stop signal generator includes a third window processor suppressing the write control signal for a predetermined period and an AND gating portion for performing an AND operation on the signal that passed through the third window processor and the header region signal detected by the header region detector.

Further, to achieve the above and other objects, there is provided a method of protecting the header region of an optical disc write apparatus reading through a pick-up a signal written on an optical disc, the signal being an RF signal, the method comprising changing the light intensity of the write laser beam emitted from the pick-up corresponding to a write signal, and writing a signal on the optical disc.

The method of protecting the header region of the optical disc write apparatus according to the present invention further includes detecting a header region from the RF signal detected from an optical disc through the pick-up, generating a write clock, generating a write control signal whose state is inverted after a lapse of a predetermined clock by counting the write clock, generating a write stop signal when the write control signal is generated in the header region signal section detected in the header region detecting, and controlling the light intensity of the write laser beam of the pick-up corresponding to the write control signal. In particular, as described in more detail below, the generating of the write stop signal comprises feeding the write control signal back to the generating of the write control signal to control the write control signal.

The header region detecting further comprises detecting a peak pulse by slicing an upper header signal included in the RF signal by a first voltage level, detecting a bottom pulse by slicing a lower header signal included in the RF signal by a second voltage level, removing pulse noise having a narrow width, which is included in the peak pulse, as a first window process, removing pulse noise having a narrow width, which is included in the bottom pulse, as a second window process and performing an OR operation on a peak signal output from the first window process and a bottom signal output from the second window process.

The write clock can be generated using a fixed crystal (X-tal) whose frequency is uniform and/or a wobble signal detected through the pick-up and a phase locked loop (PLL) circuit. The generating of the write clock further comprises detecting a count start signal to start the counting. In the counting, a first state "H," that is, a writing allowed state is output until a count value becomes a predetermined value and a second state "L," that is, a writing forbidden state is output by resetting the output when the count value becomes the predetermined value. In the counting, since the counter can be compulsorily reset responsive to the write stop signal, the counter can output the write stop state, that is, the state "L" before the output value becomes the predetermined value. In particular, the generating of the write stop signal comprises feeding the write control signal back to the generating of the write control signal to control the write control signal. The generating of the write stop signal further comprises suppressing the write control signal for a predetermined period as a third window process and performing an AND operation on the write control signal passed through the third window process and the header region signal detected in the header region detecting.

In the detecting of the count start signal, the RF signal detected through the pick-up is demodulated, the physical identification data (PID) included in the RF signal is detected, and the count start signal is generated from the PID.

BRIEF DESCRIPTION OF THE DRAWINGS

The above and other objects and advantages of the present invention will become more apparent and more readily appreciated from the following description of the preferred embodiments, taken in conjunction with the accompanying drawings of which:

FIGS. 6A through 6H are diagrams of waveforms of signals to show the operation of the write control signal generator of FIG. 5.

DESCRIPTION OF THE PREFERRED EMBODIMENTS

Figure 1:
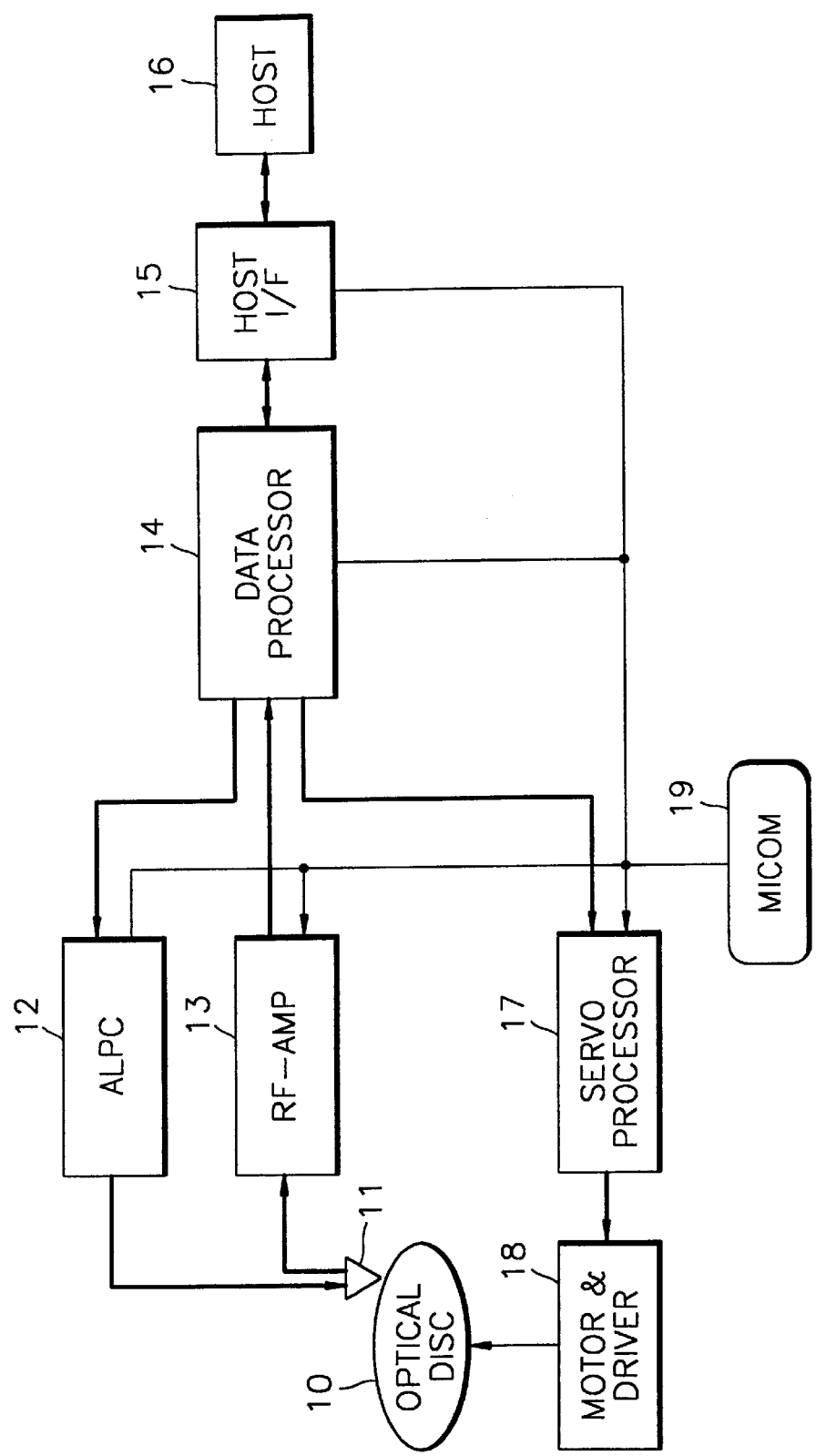
FIG. 1 is a block diagram of the structure of an apparatus protecting the header region of an optical disc according to the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing the structure of an apparatus protecting the header region of an optical disc according to the present invention. Data of a host computer 16 is sent to a data processor 14 through a host interface (IF) 15. The data processor 14 modulates the data received from the host into appropriate data of an optical disc write method such as an 8–16 method, and outputs the modulated data to an auto laser power controller (ALPC) 12 controlling the light intensity of a laser beam. The ALPC 12 is a controller changing the light intensity corresponding to the data input from the data processor 14 and writing the data on an optical disc 10 with a laser beam through a pick-up 11. Further, ALPC 12 controls the light intensity of the laser beam radiated to the optical disc 10 according to the amount of the light reflected from the optical disc 10. When reading from the optical disc 10 through the pick-up 11 to detect header and data regions of the optical disc, an RF-AMP 13 adds a plurality of signals read from the optical disc 10 through the pick-up 11 to each other, amplifies the addition result, converts the amplification result into an RF signal in the form of an eye-pattern, and outputs the converted signal to the data processor 14. The RF-AMP 13 separates a peak pulse corresponding to the header information, which is included in the RF signal, from a bottom pulse corresponding to the header information, which is included in the RF signal, and outputs the peak pulse and the bottom pulse to the data processor 14.

A motor & driver 18 rotates a spindle with the optical disc thereon and drives the pick-up 11 so that the pick-up 11 reads the sectors of the optical disc 10 and writes data in each sector. A servo processor 17 generates a control signal driving the motor & driver 18 so that the pick-up 11 reads the sectors of the optical disc 10 at a determined speed and writes data in each sector at a determined speed. A micro computer 19 can control operation of the optical write apparatus by driving the optical write apparatus. In particular, the optical write apparatus can sense/recognize the drive command of a user, control the above-mentioned respective members, and write the data of the host computer 16 on the optical disc 10 or read the signal written on the optical disc 10.

Figure 2:
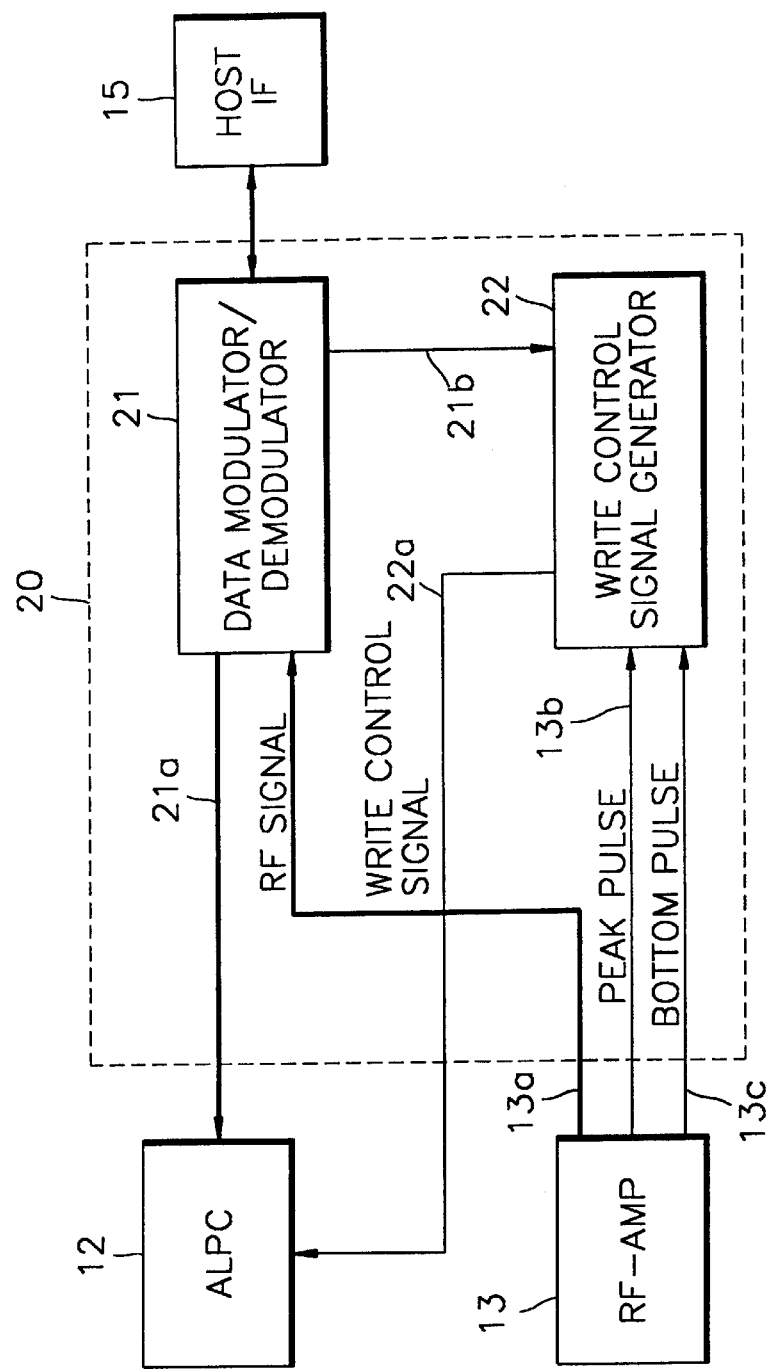
FIG. 2 is a block diagram of a write data processor in the apparatus shown in FIG. 1 in detail.

FIG. 2 shows a data processor 20 corresponding to the data processor 14 in the apparatus shown in FIG. 1 in detail. The data processor 20 in FIG. 2 includes a data modulator/demodulator 21 and a write control signal generator 22.

The data output from the host IF 15 is input to the data modulator/demodulator 21 and is modulated to have an appropriate form. For example, the 8–16 modulation method is mainly used for the DVD-RAM write method. The ALPC 12 controls the light intensity of the write laser beam corresponding to data 21a output from the data modulator/demodulator 21. Further, the ALPC 12 controls a write laser beam to be turned on and off corresponding to a write control signal 22a. As mentioned above, the ALPC 12 also controls the light intensity of the write laser beam so that the light intensity is maintained to be uniform when the laser beam is turned on according to the amount of light reflected from the optical disc. The RF-AMP 13 separates a peak pulse 13b and a bottom pulse 13c from the RF signal read from the optical disc 10 and inputs the peak pulse 13b and the bottom pulse 13c to the write control signal generator 22. The RF-AMP 13 inputs an RF signal 13a to the data modulator/demodulator 21. The data modulator/demodulator 21 detects physical identification data (PID) from the RF signal 13a, generates a count start signal 21b from the PID, and outputs the count start signal 21b to the write control signal generator 22. The write control signal generator 22 generates the write control signal 22a for controlling the ALPC 12 using the peak pulse 13b, the bottom pulse 13c, and the count start signal 21b.

Figure 3:
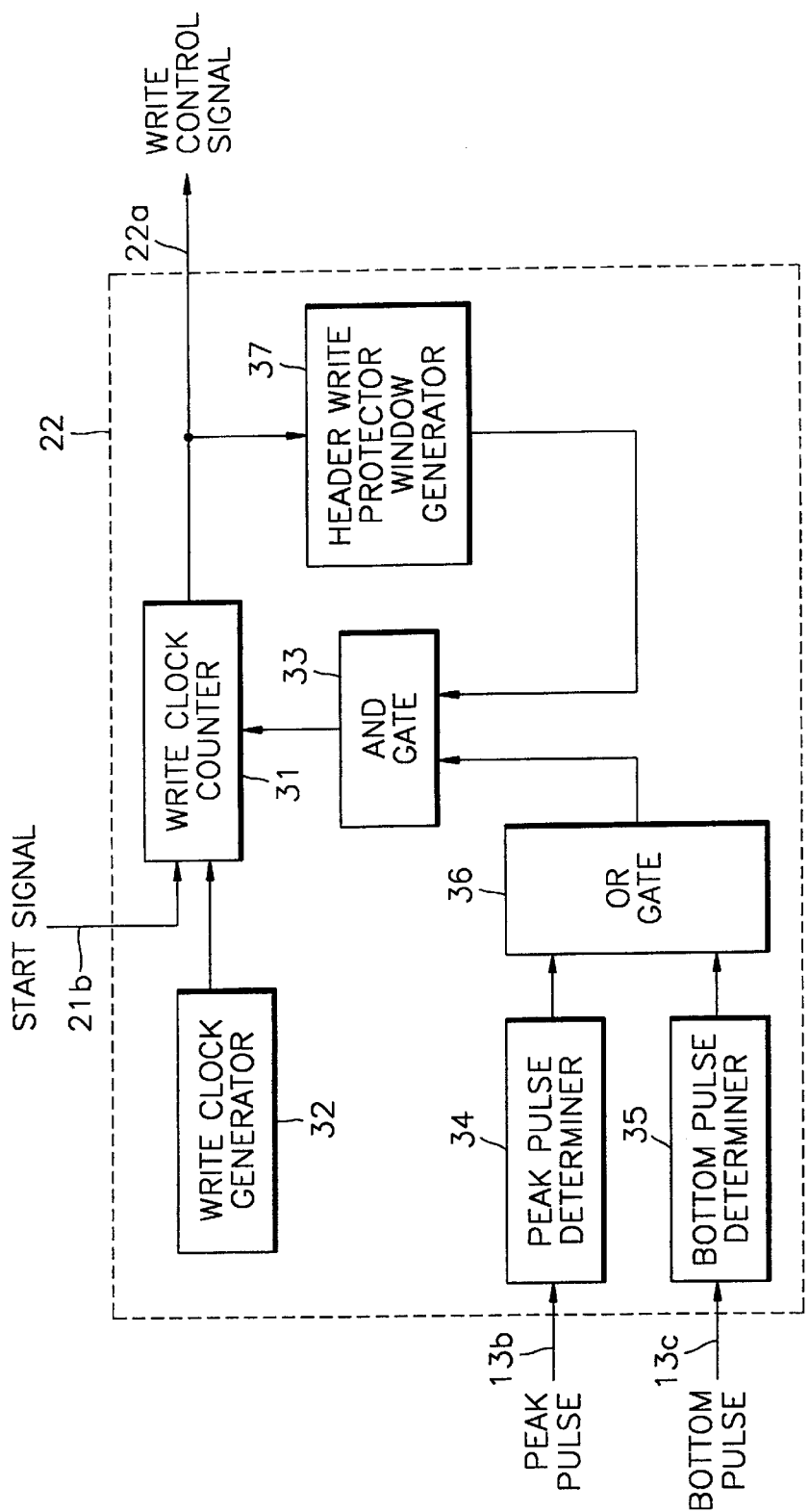
FIG. 3 is a block diagram of a write control signal generator in the data processor of FIG. 2 in detail.

FIG. 3 shows the write control signal generator 22 in the data processor of FIG. 2 in detail. The write control signal generator 22 includes a write clock counter 31, a write clock generator 32, an AND gate 33, a peak pulse determiner 34, a bottom pulse determiner 35, an OR gate 36, and a header write protector window generator 37.

The write clock counter 31 starts to count an input write clock, to generate a counter value, by the count start signal 21b, outputs the write control signal 22a to be in a first state, for example, the state "H" before or until the counter value becomes a predetermined value, and, when the counter value becomes the predetermined value, resets the counter value and outputs the write control signal 22a to be in a second state, for example, the state "L." The write clock generator 32 generates a clock used as the reference clock of the write clock counter 31. A method of generating a clock can include a fixed clock method of using a crystal and/or a wobble signal.

When the output of the AND gate 33, which is a write stop signal, is in an active state, for example, the state "H," the write stop signal compulsorily resets the output 22a of the write clock counter 31 and makes the write control signal 22a be in the second state, for example, the state "L." In particular, the AND gate 33 performs an AND operation on the header region signal output from the OR gate 36 and the signal output from the header write protector window generator 37, to output the write stop signal when a write signal in a signal section determined to be a header region is in an active state, for example, the state "H." The write stop signal compulsorily resets the output of the write clock counter 31 to be in a second state, for example, the state "L," and prevents the write signal from being written in the header region.

The OR gate 36 performs an OR operation on the output of a peak determiner 34 and the output of a bottom pulse determiner 35. Here, the peak determiner 34 suppresses the input peak pulse 13b for a predetermined period and removes pulse noise having a width less than the predetermined period. A bottom pulse generator 35 suppresses the input bottom pulse 13c for a predetermined period and removes pulse noise having a width less than the predetermined period. The predetermined period in the peak pulse and the predetermined period in the bottom pulse can be changed according to the specification of a design. For example, when the predetermined period in the peak pulse is lengthened, the characteristic of removing the pulse noise included in the peak pulse is improved and the write stop signal fully protects the header region when the write signal is generated in the header region. However, when the predetermined period in the peak pulse is determined to be 0, the function of removing the pulse noise included in the peak pulse is removed and when the write signal is generated in the header region, it may not be possible to protect the header region for a time corresponding to a width of a pulse noise. Therefore, the present invention can protect a header region for a time corresponding to width of a pulse noise in (i.e., immediately after/succeeding, and/or after) a header signal.

Further, the header write protector window generator 37 can suppress an output write control signal 22a for a predetermined time to prevent writing from being stopped by successive noise after the header region when a write stop signal would be generated in the AND gate 33. That is, the stopping of writing in regions excluding the header region is improved. Accordingly, it is possible to improve the efficiency of using the data region of an optical disc by preventing writing from being stopped in regions excluding the header region.

FIGS. 4A through 4K show the waveforms of signals in order to explain methods of protecting the header region of an optical disc according to the present invention. In particular, FIGS. 4A through 4K are waveforms describing the diminishment of two problems or solutions to two problems, that is, a case where noise having a width less than a predetermined width is included in (such as succeeding and/or after) an RF signal (FIGS. 4A–G) so that the control signal can be overwritten in the header region, and a case where data writing can be stopped when a data region is mistaken for a header region because of noise included in (such as succeeding and/or after) an RF signal within a predetermined time (FIGS. 4H–K).

Figure 4:
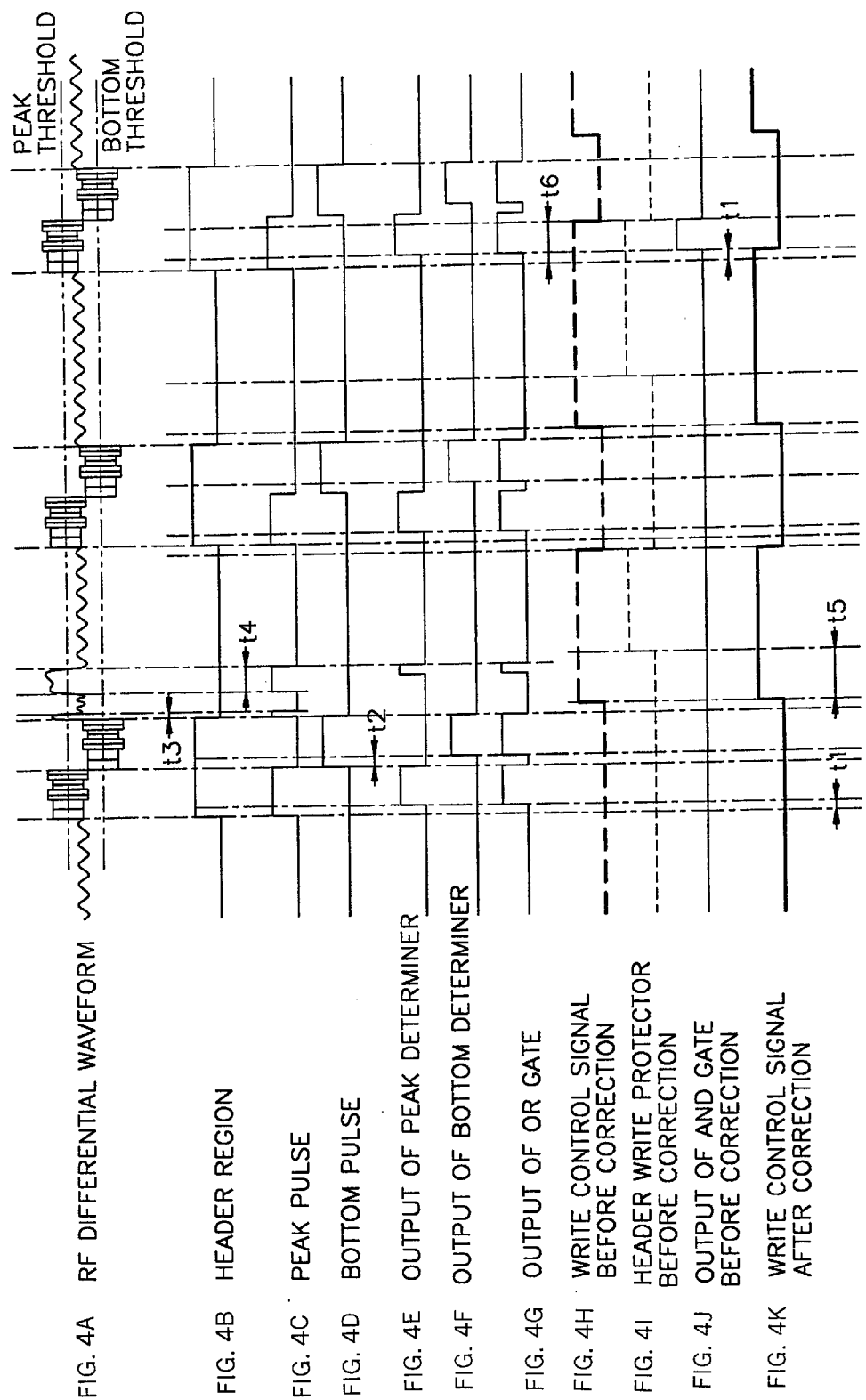
FIGS. 4A through 4K are diagrams of waveforms of signals to explain a method protecting the header region of the optical disc according to the present invention.

FIG. 4A shows an RF differential waveform including a peak header formed above the waveform of the RF signal and a bottom header formed below the waveform of the RF signal. In particular, FIG. 4A shows three header region signals indicative of header regions on an optical disc in the RF signal, including noise existing within a time succeeding the first header region signal.

FIG. 4B is a virtual signal waveform obtained by temporally adding the peak header of FIG. 4A to the bottom header of FIG. 4A, the virtual signal being in the state "H" in the header region.

FIG. 4C shows a peak pulse detected by comparing the waveform of FIG. 4A with a predetermined reference voltage (a peak threshold), which includes noise succeeding the first header region, and output from the RF-AMP 13. In this process, a peak pulse corresponding to the upper header signal is detected from the RF signal.

FIG. 4D shows a bottom pulse detected by comparing the waveform of FIG. 4A with a predetermined reference voltage (a bottom threshold), and output from the RF-AMP 13.

In this process, a bottom pulse corresponding to the lower header signal is detected from the RF signal.

FIG. 4E is a waveform showing a peak pulse window process, in which the output of the peak pulse of FIG. 4C is suppressed in the peak pulse determiner 34 of FIG. 3 for a predetermined time t1. Namely, FIG. 4E shows a waveform, in which a pulse that succeeds the header region and has a width of t3, which is less than t1, is removed through the peak pulse window process.

FIG. 4F is a waveform showing a bottom pulse window process, in which the output of the bottom pulse of FIG. 4D is suppressed in the bottom pulse determiner 35 of FIG. 3 for a predetermined time t2. In FIG. 4E, if a pulse having a width less than t2 is included in the bottom pulse of FIG. 4D, the pulse would be removed in the bottom pulse window process.

FIG. 4G shows the waveform of the output of the OR gate 36 of FIG. 3, which is the waveform output during a process of performing an OR operation on the waveforms of FIGS. 4E and 4F. In this process, the OR operation is performed on the output of the peak detection process (i.e., the peak pulse window process) obtaining the waveform of FIG. 4E from the waveform of FIG. 4A, and on the output of the bottom detection process (i.e., the bottom pulse window process) obtaining the waveform of FIG. 4F from the waveform of FIG. 4A.

FIG. 4H is a virtual signal waveform showing a case where the write control signal is overwritten in a third header region of FIG. 4H. Namely, FIG. 4H is a signal waveform showing a write control signal before correction, in which it is assumed that the output of the AND gate 33 is not fed back to the write clock counter 31 in FIG. 3, for the convenience of explanation. As mentioned above, three representative factors causing such a case will now be described. First, when the length of a write clock period is greater than a normal length of the write clock, data can be written in the header region of the next sector after the data is written in the data region and the buffer region of a current sector. Second, data can be overwritten in the header region since a jump from a zone where data is currently written to other zones can occur due to a disturbance or other factors. Third, data can be overwritten in the header region when a write clock is generated using a fixed crystal (X-tal) that cannot sense change in the rotation speed of a disc and when the rotation speed of a spindle motor is excessively high. Due to such factors, in the third header region of waveform of FIG. 4H, a region where a write signal whose length corresponds to t1 can simultaneously exist with a region where a write signal whose length corresponds to t6. Namely, a signal for writing data in the ALPC 12 of FIG. 2 is provided even in the header region. The rising edge of the write control signal 22a is driven by the count start signal 21b of FIG. 2 and falls when a predetermined number of write clocks are counted by the write clock counter 31 of FIG. 3 through the counting process. The count start signal is generated from the PID of the RF signal through the start signal detection process. The write clock can be generated from the RF signal through a write clock generation process and/or generated by a fixed crystal.

FIG. 4I is a waveform obtained by suppressing the output of the waveform of FIG. 4H through the header write protector window 37 of FIG. 3 for a predetermined time t5. Namely, for convenience of explanation, FIG. 4I is a signal waveform showing the output signal of the header write protector window generator 37 in a state where it is assumed that the output of the AND gate 33 is not fed back to the write clock counter 31 in FIG. 3.

FIG. 4J shows a waveform obtained by removing noise that exists within a time of t5, which succeeds the first header region of FIG. 4C, through the header write protector window 37 process. After performing an AND operation on the output waveform of the header write protector window 37 and the output waveform of the OR gate 36 by the AND gate 33, the write stop signal before correction, from which the influence of the noise pulse is excluded, is obtained within the time t5, which is successive to the header region as shown in FIG. 4J. At this time, t3 is no more than t1 and t4 is within the time of t5. The efficiency of using the data region is improved by preventing writing from being stopped due to the noise pulse, which succeeds the header region, through the above process.

FIG. 4K shows a signal waveform obtained by compulsorily resetting the write control signal 22a when the write stop signal is generated by the waveform of FIG. 4J. For example, the header region is protected by preventing the write signal from being written in the header region during a section t6 through such a feed back process. As mentioned above, the time t1 can be determined to be an appropriate value more than zero according to the specification of a design. Namely, when t1 is set not to be 0, in the case where the write control signal is generated in the header region, it is possible to minimize the damage to the header region. When t1 is set to zero, the characteristic of removing noise having a narrow width, which is included in the RF signal, cannot be expected and the damage to the header region increases when the write control signal is generated in the header region. However, when t1 is lengthened, the characteristic of removing noise having a narrow width, which is included in the RF signal, is improved.

Figure 5:
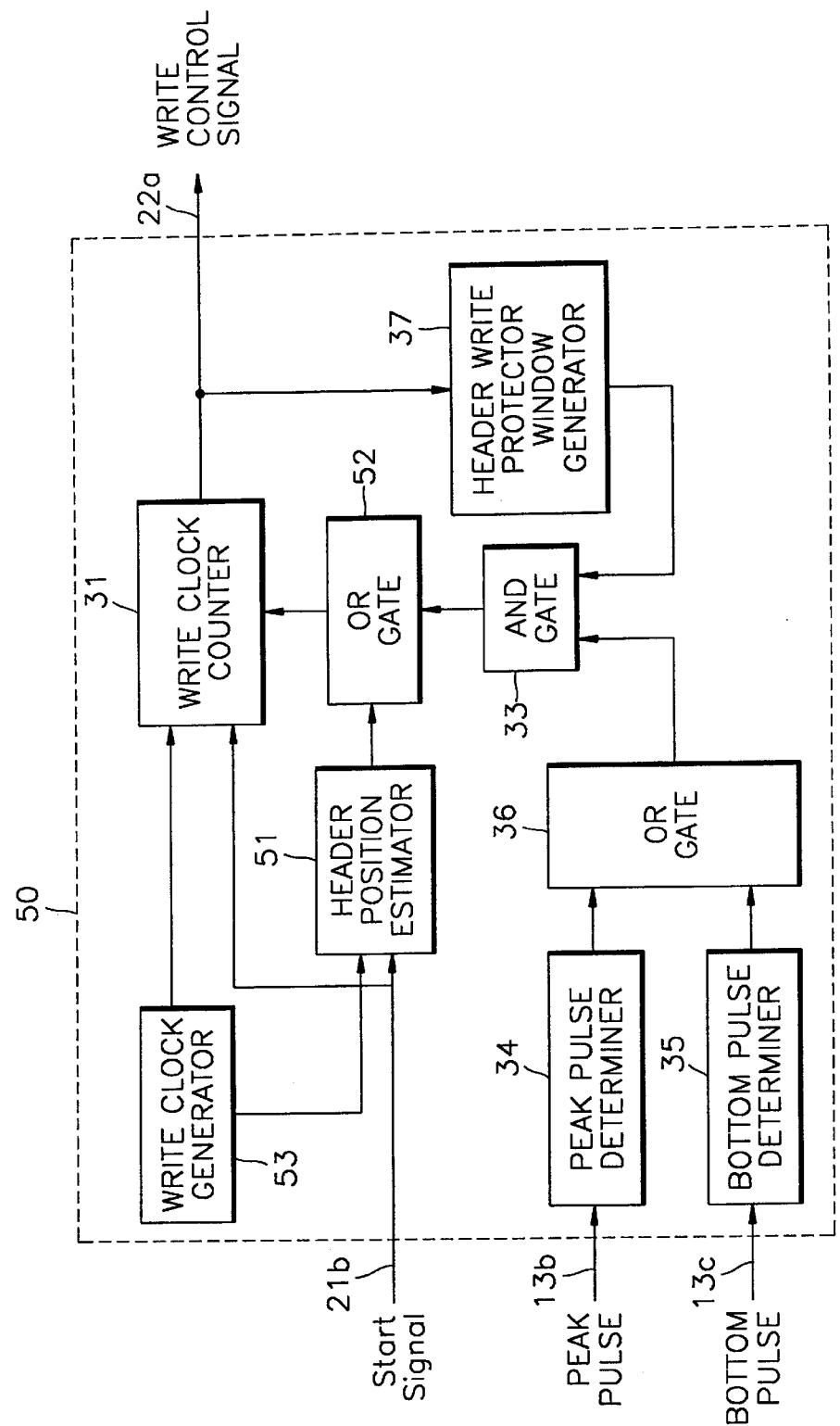
FIG. 5 is block diagram of another embodiment of a write control signal generator in the data processor of FIG. 2.

FIG. 5 shows another embodiment of the write control signal generator in the data processor of FIG. 2 in detail. In order to protect the header region even when errors occur in detecting the header signal, still another embodiment of the present invention, in which a header position estimator 51 and an OR gate 52 are added to the block of FIG. 3, is shown in FIG. 5. Therefore, reference numerals identical to those of FIG. 3 denote members identical to those of FIG. 3. Another description of the contents already described with reference to FIG. 3 will be omitted.

In FIG. 5 a write clock generator 53 includes a fixed clock generator using a crystal and a wobble clock generator using a wobble signal. It is possible to use a fixed clock and a wobble clock as a counter input in the write clock counter 31 according to the embodiment of FIG. 5. The header position estimator 51 is a counter, which starts counting by the start signal 21b the write clock supplied from the write clock generator 53. The header position estimator 51 generates an output (as described in more detail below) when the count value becomes a predetermined value. When the write clock counter 31 uses the fixed clock, the wobble clock is used as the input clock of the header position estimator 51. On the contrary, when the write clock counter 31 uses the wobble clock, the fixed clock is used as the input clock of the header position estimator 51. The above two cases are a design specification selectively determined by a designer during the designing of a product. One of the two cases is applied to FIG. 5.

First, the case where the write clock counter 31 uses the fixed clock as the counter input and the wobble clock as the input clock of the header position estimator 51 will be described. When the write clock counter 31 uses the fixed clock as the counter input and the rotation speed of a spindle motor is equal to or lower than normal/specified speed, since the header region is reached or recognized after the counter value of the write clock counter 31 becomes a predetermined value, the write control signal is generated so that data is not written in the header region. Accordingly, data is not written in the header region. However, in the case where the rotation speed of the spindle motor is higher than a normal/specified speed, when errors occur in detecting the peak and bottom pulses, data is written even in the header region in the embodiment of FIG. 3 where only the write clock counter 31 is used. In the embodiment of FIG. 5, the rotation speed of the spindle motor can be higher than normal speed and still possible to prevent data from being written in the header region even when errors occur in detecting the peak and bottom pulses since the header position estimator 51, in which the wobble clock is used as the input clock, and the OR gate 52 are added. Since the rotation speed of the spindle motor is reflected in the period of the wobble clock, a time taken for the count value of the header position estimator 51 to become a predetermined value is shortened when the rotation speed of the spindle motor increases. Accordingly, the write control signal 22a is generated to not be written in the header region by resetting the write clock counter 31 through the OR gate 52 before the header region is reached.

The case where the wobble clock is used as the input of the write clock counter 31 and the fixed clock is used as the input of the header position estimator 51 will now be described. When the wobble clock is used as the input of the write clock counter 31 and the rotation speed of the spindle motor is equal to or lower than a normal/specified speed or the period of the wobble clock is equal to or shorter than a normal/specified period, since the header region is reached after the count value of the write clock counter 31 becomes a predetermined value, the write control signal is generated to not be written in the header region. Therefore, data is not written in the header region. However, when errors occur in detecting the peak and bottom pulses so that the period of the wobble clock is longer than the normal/specified period or in the case where the rotation speed of the spindle motor is higher than the normal/specified speed, the header region can be reached or recognized before the count value of the write clock counter 31 becomes a predetermined value. In this case, data is written even in the header region in the embodiment of FIG. 3, in which only the write clock counter 31 is used. However, in the embodiment of FIG. 5, it is possible to prevent data from being written in the header region even when errors occur in detecting the peak and bottom pulses since the header position estimator 51 using the fixed clock as an input and the OR gate 52 are added. Namely, since a time taken for the count value of the header position estimator 51 using the fixed clock as an input to become a predetermined value is uniform, the write control signal 22a is generated to not be written in the header region by resetting the write clock counter 31 using the output of the header position estimator 51 before the write clock counter 31 for counting the slowed or longer wobble clock becomes a predetermined value.

FIGS. 6A through 6H are signal waveforms showing the operation of the write control signal generator of FIG. 5.

FIG. 6A is a virtual waveform that shows three header regions. In particular, FIG. 6A shows three header region signals indicative of header regions on an optical disc in the RF signal. The dotted area after the third header region shows a state in which there are defects in the third header region due to defects on the disc.

FIG. 6B shows the detected peak pulse output from the RF-AMP 13. Dotted lines show a state in which the peak pulse is not detected due to the defects in the header of the disc.

FIG. 6C shows the detected bottom pulse output from the RF-AMP 13. FIGS. 6D and 6E show waveforms, in which the output is suppressed for a predetermined time in the peak pulse determiner 34 and the bottom pulse determiner 35.

FIG. 6F shows the start signal 21b generated from the PID that is header information by demodulating the RF signal. The count operations of the write clock counter 31 and the header position estimator 51 start by the start signal 21b.

FIG. 6G is a waveform showing a header estimation output that is the output of the header position estimator 51. The header estimation signal is output when the count value becomes a predetermined value (K) after starting the count from the point of time at which the start signal is generated. When the fixed clock is used as the clock input of the header position estimator 51, t7 is equal to t8. When the wobble signal is used as the clock input, t7 and t8 increase when the rotation speed of the spindle motor is reduced and decrease when the rotation speed of the spindle motor increases.

FIG. 6H shows the output of the write clock counter 31, which is corrected so that data is not written in the header region even when detection of the peak pulse is omitted according to the embodiment of FIG. 5. The section A is in a state in which there are no defects in the successive header region and the write clock and the rotation of the spindle are normal, that is, a state in which a write control signal section t9 ends prior to the successive header region and thus, writing is forbidden in the header region of the disc. However, in the section B, errors occur in detecting the successive header region and the period of the wobble clock that is the write clock is longer than a normal period. In this case, the write control signal section t8 ends by the header estimation output using the fixed clock. In this case, the write control signal corrected to not be written in the header region is shown.

According to the above-described apparatus and method, it is possible to prevent data from being overwritten in the header region and to prevent data writing from being stopped in the data region in the optical disc write apparatus. When there are defects in the header region of the disc, it is possible to prevent data from being overwritten in the header region.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of protecting a header region of an optical disc, in a process of writing data on the optical disc by controlling an intensity of a laser beam which is radiated to optical disc divided into the header region and a data region, comprising:

detecting a header region signal indicative of the header region from an RF signal detected from the optical disc;

generating a write clock;

generating a write control signal whose state is inverted after a lapse of a predetermined clock by counting the write clock;

controlling the intensity of the write laser beam corresponding to the write control signal; and generating write stop signal to control the write control signal when the write control signal is generated in the header region detected in the detecting of the header signal.

2. The method of claim 1, wherein the header region detecting comprises:

detecting an upper header signal included in the RF signal;

detecting a lower header signal included in the RF signal; and performing an OR operation on the upper header signal and the lower header signal.

3. The method of claim 2, wherein the detecting of the upper header signal comprises:

detecting a peak pulse corresponding to the upper header signal included in the RE signal; and removing noise having a pulse width within a predetermined time included in the peak pulse by suppressing the peak pulse.

4. The method of claim 2, wherein the detecting of the lower header signal comprises:

detecting a bottom pulse corresponding to the lower header signal included in the RE signal; and removing noise having a pulse width within a predetermined time, which is included in the bottom pulse by suppressing the bottom pulse.

5. The method of claim 1, wherein the generating of the write clock comprises generating the write clock from a fixed frequency crystal oscillation.

6. The method of claim 1, wherein the generating of the write clock comprises generating the write clock from a wobble signal detected from the RF signal.

7. The method of claim 1, wherein the generating of the write control signal comprises:

detecting a count start signal from the RF signal;

counting the write clock responsive to the count start signal and generating a count value; and outputting a first state until the count value becomes a predetermined value and resetting the first state to be in a second state when the count value becomes the predetermined value.

8. The method of claim 7, wherein the counting further comprises compulsorily resetting the count value responsive to the write stop signal.

9. The method of claim 1, wherein the generating of the write stop signal comprises:

suppressing the write control signal for a predetermined period; and performing an AND operation on the signal suppressed and the header region signal.

10. An apparatus protecting a header region of an optical disc, in an apparatus writing data on the optical disc by controlling an intensity of a laser beam which is radiated to the optical disc divided into the header region and a data region, comprising:

a header region detector detecting a header region signal indicative of the header region from an RF signal detected from the optical disc;

a write clock generator generating a write clock;

a write control signal generator counting the write clock and generating a write control signal whose state is inverted after a lapse of a predetermined clock;

a write controller controlling the intensity of the write laser beam corresponding to the write control signal; and a write stop signal generator generating a write stop signal and controlling the write control signal when the write control signal is generated in the header region according to the header region signal.

11. The apparatus of claim 10, wherein the header region detector comprises:

a peak detector detecting an upper header signal included in the RF signal;

a bottom detector detecting a lower header signal included in the RF signal; and an OR gate circuit performing an OR operation on the upper header signal detected by the peak detector and the lower header signal detected by the bottom detector.

12. The apparatus of claim 11, wherein the peak detector comprises:

a peak pulse detector detecting a peak pulse corresponding to the upper header signal included in the RF signal; and a first window processor removing noise having a pulse width within a first predetermined time, which is included in the peak pulse, by suppressing the peak pulse detected by the peak pulse detecting means for a second predetermined time greater than the first predetermined time.

13. The apparatus of claim 11, wherein the bottom detector comprises:

a bottom pulse detector detecting a bottom pulse corresponding to the lower header signal included in the RF signal; and a second window processor moving noise having a pulse width within a first predetermined time, the noise being included in the bottom pulse, by suppressing the bottom pulse detected by the bottom pulse detecting means for a second predetermined time greater than the first predetermined time.

14. The apparatus of claim 10, wherein the write clock generator generates the write clock using a fixed frequency crystal oscillation.

15. The apparatus of claim 10, wherein the write control signal generator comprises:

a start signal detector detecting a count starting signal from the RF signal; and a counter generating a count value by starting to count the write clock responsive to the count start signal separated by the start signal detector, outputting a first state until the count value becomes a predetermined value, and resetting the output to a second state when the count value becomes the predetermined value.

16. The apparatus of claim 15, wherein the counter compulsorily resets the output thereof in response to the write stop signal.

17. The apparatus of claim 10, wherein the write stop signal generator comprises:

a third window processor suppressing the write control signal for a predetermined period; and an AND gate circuit performing an AND operation on the signal suppressed for the predetermined period by the third window processor and the header region signal detected by the header region detector.

18. An apparatus for protecting a header region of an optical disc, in an apparatus for writing data on the optical disc by controlling an intensity of a laser beam which is radiated to the optical disc divided into the header region and a data region, comprising:

header region detecting means for detecting a header region signal indicative of the header region from an RF signal detected from the optical disc;

first clock generating means for generating a write clock;

second clock generating means for generating a clock different from the write clock;

first counting means for counting the write clock and generating a write control signal;

second counting means for counting the clock output by the second clock generating means and outputting a header position estimation signal when the count value becomes a predetermined value;

AND gating means for generating an active output when the write control signal is generated in the header region detected by the header region detecting means;

write stop signal generating means for resetting the output of the first counting means using the output of the second counting means and the output of the AND gating means; and write controlling means for controlling the intensity of the write laser beam responsive to the write control signal.

19. An apparatus writing data on the optical disc by controlling an intensity of a laser beam radiated to the optical disc divided into a header region and a data region and protecting the header region from the writing, the apparatus comprising:

header region detecting means for detecting a header region signal indicative of the header region from an RF signal detected from the optical disc;

write clock generating means for generating a write clock;

write control signal generating means for counting the write clock and generating a write control signal whose state is inverted after a lapse of a predetermined clock;

write control signal generating means for controlling the intensity of the write laser beam corresponding to the write control signal; and write stop signal generating means for generating a write stop signal and controlling the output of the write control signal when the write control signal is generated in the header region according to the header region signal.

20. An apparatus writing data on the optical disc by controlling an intensity of a laser beam radiated to the optical disc divided into a header region and a data region and protecting the header region from the writing, the apparatus comprising:

a header region detector detecting a header region indicative of the header region from an RF signal detected from the optical disc;

a first clock generator generating a write clock;

a second clock generator generating a clock different from the write clock;

a first counter counting the write clock and generating a write control signal;

a second counter counting the clock output by the second clock generator and outputting a header position estimation signal when the count value becomes a predetermined value;

an AND gate circuit generating an active output when the write control signal is generated in the header region detected by the header region detector;

a write stop signal generator resetting the output of the first counter using the output of the second counter and the output of the AND gate circuit; and a write controller controlling the intensity of the write laser beam responsive to the write control signal.

21. The apparatus of claim 20, wherein the first clock generator generates the write clock from a fixed frequency crystal oscillation and the second clock generator generates the write clock from a wobble signal detected from the RF signal.

22. The apparatus of claim 20, wherein the first clock generator generates the write clock from a wobble signal detected from the RF signal and the second clock generator generates the write clock from a fixed frequency crystal oscillation.

23. The apparatus of claim 20, wherein the first and second counters receive a count start signal from the RF signal to start the counting.

24. A processor protecting a header region of an optical disc in an apparatus writing data to the optical disk using a laser, the processor comprising:

a header region detector detecting a header region signal indicative of the header region from an RF signal detected from the optical disc; and a header protector generating a write stop signal controlling output of a write control signal used to control the laser when the write control signal is generated in the header region according to the header region signal.

25. The processor according to claim 24, wherein the header protector, after the header region is detected, further suppresses the write control signal for a predetermined time to prevent writing from being stopped by successive noise within the predetermined time.

26. The processor according to claim 24, wherein the header protector further comprises:

a first clock generator generating a write clock;

a first counter counting the write clock to generate a first count value and outputting the write control signal whose state is inverted after reset of the counter value; and a write stop signal generator receiving the write control signal output from the first counter and resetting the first count value when the write control signal is generated in the header region according to the header region signal.

27. The processor according to claim 26, wherein the write stop signal generator further comprises:

a second clock generator generating a clock different from the write clock a second counter counting the clock output by the second clock generator to generate a second count value and outputting a header position estimation signal when the count value becomes a predetermined value, wherein the write stop signal generator resets the first count value responsive to output of the second counter and the output of the first counter.

28. The apparatus of claim 27, wherein the first and second counters receive a count start signal from the RF signal to start the counting.

29. The apparatus of claim 27, wherein the first clock generator generates the write clock from a fixed frequency crystal oscillation and the second clock generator generates the write clock from a wobble signal detected from the RF signal.

30. The apparatus of claim 24, wherein the header protector removes noise having a pulse width within a predetermined time included after the header region signal.

31. A method of protecting a header region of an optical disc in an apparatus writing data to the optical disk using a laser, the method comprising:

detecting a header region signal indicative of the header region from an RF signal detected from the optical disc; and generating a write stop signal controlling output of a write control signal used to control the laser when the write control signal is generated in the header region according to the header region signal.

* * * * *